United States Patent
Gao et al.

(10) Patent No.: US 10,077,214 B2
(45) Date of Patent: Sep. 18, 2018

(54) SINTERED POROUS MATERIAL AND FILTER ELEMENT USING SAME

(71) Applicant: Intermet Technologies Chengdu Co., Ltd., Chengdu, Sichuan (CN)

(72) Inventors: Lin Gao, Chengdu (CN); Tao Wang, Chengdu (CN); Bo Li, Chengdu (CN)

(73) Assignee: INTERMET TECHNOLOGIES CHENGDU CO., LTD, Sichuan, Chengdu (CN)

(*) Notice: Subject to any disclaimer, the term of this patent is extended or adjusted under 35 U.S.C. 154(b) by 335 days.

(21) Appl. No.: 14/901,985

(22) PCT Filed: Jun. 30, 2014

(86) PCT No.: PCT/CN2014/081078
§ 371 (c)(1),
(2) Date: Feb. 5, 2016

(87) PCT Pub. No.: WO2015/000387
PCT Pub. Date: Jan. 8, 2015

(65) Prior Publication Data
US 2016/0221883 A1 Aug. 4, 2016

(30) Foreign Application Priority Data

Jun. 30, 2013 (CN) .......................... 2013 1 0268752

(51) Int. Cl.
| | | |
|---|---|---|
| *C04B 38/00* | (2006.01) | |
| *C04B 38/06* | (2006.01) | |
| *B01D 39/06* | (2006.01) | |
| *C04B 35/00* | (2006.01) | |
| *C04B 38/02* | (2006.01) | |
| *B01D 39/20* | (2006.01) | |
| *C04B 35/56* | (2006.01) | |
| *C04B 35/626* | (2006.01) | |
| *C04B 35/64* | (2006.01) | |

(52) U.S. Cl.
CPC .............. *C04B 38/02* (2013.01); *B01D 39/20* (2013.01); *B01D 39/2075* (2013.01); *C04B 35/5615* (2013.01); *C04B 35/62695* (2013.01); *C04B 35/64* (2013.01); *B01D 2239/1208* (2013.01); *B01D 2239/1216* (2013.01); *C04B 2235/3843* (2013.01); *C04B 2235/402* (2013.01); *C04B 2235/404* (2013.01); *C04B 2235/422* (2013.01); *C04B 2235/428* (2013.01); *C04B 2235/44* (2013.01); *C04B 2235/5436* (2013.01); *C04B 2235/604* (2013.01); *C04B 2235/6565* (2013.01); *C04B 2235/6567* (2013.01); *C04B 2235/661* (2013.01); *C04B 2235/80* (2013.01); *C04B 2235/81* (2013.01); *C04B 2235/94* (2013.01); *C04B 2235/96* (2013.01); *C04B 2235/9669* (2013.01); *C04B 2235/9684* (2013.01)

(58) Field of Classification Search
CPC ... C04B 38/02; C04B 35/64; C04B 35/62695; C04B 35/5615; C04B 2235/422; C04B 2235/6565; C04B 2235/604; C04B 2235/5436; C04B 2235/44; C04B 2235/428; C04B 2235/9669; C04B 2235/404; C04B 2235/402; C04B 2235/3843; C04B 2235/94; C04B 2235/81; C04B 2235/80; C04B 2235/661; C04B 2235/6567; C04B 2235/96; C04B 2235/9684; C04B 32/62695; B01D 39/2075; B01D 39/20; B01D 2239/1208; B01D 2239/1216
See application file for complete search history.

(56) References Cited

U.S. PATENT DOCUMENTS

| | | | | |
|---|---|---|---|---|
| 5,195,319 A | * | 3/1993 | Stobbe | ............... B01D 39/2034 55/466 |
| 5,824,220 A | * | 10/1998 | Grangeon | .......... B01D 67/0041 210/490 |
| 2005/0262965 A1 | * | 12/2005 | Palanisamy | ............. C22C 29/06 75/236 |
| 2007/0039471 A1 | * | 2/2007 | Hofmann | ........... B01D 67/0062 96/4 |
| 2010/0009143 A1 | * | 1/2010 | Pailler | .................... B82Y 30/00 428/210 |
| 2010/0055492 A1 | * | 3/2010 | Barsoum | ................ B22D 19/02 428/613 |
| 2011/0104464 A1 | * | 5/2011 | Pyzik | .................. C04B 35/5615 428/218 |
| 2011/0257008 A1 | | 10/2011 | Bartholomew et al. | |

FOREIGN PATENT DOCUMENTS

| | | |
|---|---|---|
| CN | 101747075 A | 6/2010 |
| CN | 102557718 A | 7/2012 |

OTHER PUBLICATIONS

"Microstructure and mechanical properties of porous Ti3SiC2" ZM Sun, A Murugaiah, T Zhen, A Zhou and M W Barsoum Acta Materiala 53 (2005) 4359-4366 (available on Science Direct).*

* cited by examiner

*Primary Examiner* — Pamela H Weiss
(74) *Attorney, Agent, or Firm* — Meng Ouyang

(57) ABSTRACT

A sintered porous material with stronger corrosion resistance comprising three elements Ti, Si and C which constitute at least 90% of the weight of the porous material, wherein the porous material has 30-60% porosity, 0.5-50 μm average pore size, and at least 23 MPa tensile strength, wherein the porous material of 5 mm thickness under 0.05 MPa pressure has a pure water filtration flux of at least 1 t/m$^2$·h, and a weight loss rate of no more than 1.5% after having been immersed in a 5 wt % hydrochloric acid solution at room temperature for 48 days.

5 Claims, No Drawings

SINTERED POROUS MATERIAL AND FILTER ELEMENT USING SAME

TECHNICAL FIELD

The present invention relates to a porous material and a filter element using same, and in particularly relates to a sintered porous material prepared by a powder metallurgy method and a filter element using same.

BACKGROUND ART

At present, the research on the sintered porous materials mainly focuses on several aspects of the optimization of preparing processes, the investigations on pores-forming mechanisms, the improvement of material properties and the expansion of application ranges, wherein, as for the pores-forming mechanisms, the pores-forming means applied to the method for preparing the sintered porous materials mainly comprises: firstly, pores formed by chemical reactions, the mechanism of which is on the basis of the partial diffusion effect caused by the larger differences in the intrinsic diffusion coefficients of different elements, thereby resulting in generating the Kirkendall pores in the materials; secondly, pores formed by the physical accumulation of raw materials particles; and thirdly, pores formed by the escape of additives. The select and combination of the pores-forming means described above would directly and inevitably affect the pore structure of the porous materials. The pore structures of the porous materials would further determine the properties of the porous materials. Thus, the sintered porous materials generated on the basis of different pores-forming means always have different pore structures and using performances, and these porous materials can be identified and characterized more clearly by understanding and measuring the pore structures and use performances. At present, in order to adequately characterize the porous materials, it is usually adopted in the art of: 1) compositions and contents of the raw materials; 2) pore structure parameters, mainly comprising porosity, pore diameter and so on; 3) material properties, comprising permeability, mechanical strength and chemical stability, wherein, the permeability is usually measured by a fluid permeation method, the mechanical strength is usually characterized by tensile strength, and the chemical stability is mainly characterized by acid resistance and/or alkali resistance.

A Ti—Al intermetallic compound porous material is a sintered inorganic porous material between high temperature alloys and ceramics. It is bonded together by metallic bonds and covalent bonds and has common advantages of both metal materials and ceramic materials, thus, the Ti—Al intermetallic compound porous material has broad application prospects as a filter material. It is generally acknowledged that the Ti—Al intermetallic compound porous material has excellent properties; however, the corrosion resistance property in strong acid conditions of the Ti—Al intermetallic compound porous material still needs to be improved. For example, in the condition of keeping temperature at 90° C., when the pH value decreases from 3 to 2, both of the weight loss and porosity of the sample of the Ti—Al intermetallic compound porous material with the Al content of 35 wt. % increase significantly, and it is indicated that the corrosion resistance of the material reduces significantly. Therefore, for some special application conditions, the corrosion resistance of the material still needs to be further improved. Before the filing date of the present application, the sintered porous material, which is similar to the Ti—Al intermetallic compound porous material having the common features of the metal materials and ceramics materials and also has stronger corrosion resistance at the same time, has not been discovered.

CONTENTS OF THE INVENTION

The technical problem to be solved by the present application is providing a sintered porous material with stronger corrosion resistance and a filter element using same.

The sintered porous material of the present application has the following features of that:
- a) it mainly consists of three elements of Ti, Si and C, and the total weight of these three elements accounts for at least 90% of the weight of the sintered porous material, wherein the weight of Ti is 60-75% of the total weight of Ti, Si and C, and the weight of Si is 10-20% of the total weight of Ti, Si and C;
- b) C in the sintered porous material is mainly present in the form of the $Ti_3SiC_2$ ternary MAX phase compound, and is almost uniformly dispersed in the porous material;
- c) the porous material has porosity of 30-60%, average pore diameter of 0.5-50 μm, tensile strength of at least 23 MPa, pure water filtration flux of 1 $t/m^2 \cdot h$ at least measured under a filtration pressure difference of 0.05 MPa with a thickness of 5 mm at most for the tested porous material, and a weight loss rate of 1.5% at most after being immersed into a 5 wt. % chlorhydric acid solution at room temperature for 48 days.

The abovementioned sintered porous material can only consist of three elements of Ti, Si and C, and other substance in addition to Ti, Si and C, such as one or more elements of Cr, Mo, V, Nb, Al and W, can also be added within the range of up to 10% of the total weight of the sintered porous material. At present, it is suggested that the total weight of the three elements of Ti, Si and C would be controlled at least 95%, 97%, 98% or 99% of the weight of the porous material, thereby ensuring the properties of the sintered porous material, and meanwhile, simplifying the kinds of raw materials so as to facilitate the production.

When the sintered porous material consists of three elements of Ti, Si and C, it is most preferred to control the ratio of Ti, Si and C, such that the crystalline phase of the sintered material consists of the $Ti_3SiC_2$ ternary MAX phase compound, thereby obtaining the best corrosion resistance.

The sintered porous material of the present application has following beneficial technical effects:
1. the sintered porous material has an extremely excellent corrosion resistance property;
2. the especially surprising is that, C and Ti in the raw materials react, thus the pore structures are improved, such that the tortuosity factor of the three-dimensional through hole decreases, the passing resistance of the filter media reduces, and the more preferable filtration flux can be obtained;
3. when the crystalline of the sintered porous material consists of the $Ti_3SiC_2$ ternary MAX phase, the corrosion resistance of the material can be improved.

DETAILED EMBODIMENTS

Hereinafter, the methods for preparing the sintered porous material and the sintered porous material obtained by these methods are described in detail through experiments. Through these descriptions, a person skilled in the art can clearly understand the prominent features of the sintered porous material of the present application. The numbers of experimental examples referred to hereinafter are in accordance with the numbers of the corresponding "pressed compacts" and "samples".

Ten experimental examples as following are prepared in order to describe the sintered porous material of the present application and the method for preparing same. Among them, the samples 1 to 5 prepared through the experimental examples 1 to 5 respectively are within the scope of the sintered porous material set forth in claim 1 of the present application. The experimental examples 6 to 10 are the comparison experiments for illustrating the substantive features and technical effects of the experimental examples 1 to 5, and "*"s are marked on the numbers of the experimental examples 6 to 10 for distinguishing. The experimental example 6 specifically increases the content of the Ti powder and the C powder in the raw materials as compared to the experimental example 2, and the sample 6 and sample 2 prepared therefrom are compared. The experimental example 7 specifically changes the C powder raw material in the raw materials to TiC powder (with the C content constant) as compared to the experimental example 2, and the sample 7 and sample 2 prepared therefrom are compared. The experimental example 8 directly adopts the $Ti_3SiC_2$ powder as the raw material for preparing the porous material. The experimental example 9 and experimental example 10 respectively apply an existing method for preparing the sintered Ti—Si—C based alloy porous material. The details are as following.

1 Material Preparing Process

The components and content (by the weight percentage) of the raw materials of the experimental examples 1 to 10 are shown in Table 1. For facilitating comparison, it is wholly adopted the Ti powder and TiC powder with a particle size of −400 mesh, the $TiH_2$ powder with a particle size of −325 mesh, the Si powder with a particle size of 10-15 μm, the C powder with a particle size of 3-5 μm, the $Ti_3SiC_2$ powder with a particle size of 15-20 μm and the $NH_4HCO_3$ (the pore forming agent) with a particle size of −100 mesh. Certainly, in actual manufacture, a person skilled in the art can also pertinently adjust the particle size of each raw material according to the desired pore diameter of the porous material.

As listed in Table 1, the raw materials of the experimental example 9 and the experimental example 10 consist of the pore forming agent (specifically adopting $NH_4HCO_3$), $TiH_2$ powder, TiC powder and Al powder. In the experimental example 9, the content of $NH_4HCO_3$, the $TiH_2$ powder, TiC powder and Si (in atom percentage) is 15%, 35%, 35% and 15 respectively, and by converting into weight percentage, is about 21.72%, 32.08%, 38.50% and 7.70% respectively. In the experimental example 12, the content of $NH_4HCO_3$, the $TiH_2$ powder, TiC powder and Si (in atom percentage) is 5%, 35%, 50% and 10% respectively, and by converting into weight percentage, is 7.28%, 32.36%, 55.30% and 5.16% (see Table 1).

The raw materials of the experimental examples 1 to 10 are mixed respectively according to the listed content in Table 1. After thoroughly mixing, considering that the lighter weight the C powder is doped in the raw materials of the experimental examples 1 to 6 and easily leads to segregation, thus, it further needs to granulate the powder materials of the experimental examples 1 to 6 and perform drying after the granulation, wherein the drying temperature is set to 55° C., and the drying time is set to 6 hours. Whereas the experimental examples 7 to 10 do not include the C powder, thus the next forming process can be performed directly without the need of granulation. The granulation and drying are just for avoiding the segregation, but do not further affect the final pore structures and properties of the materials, hence, the granulation and drying do not affect the accuracy of the experimental comparison.

The powder materials of the experimental examples 1 to 10 are respectively filled into cold isostatic pressing forming molds with a unified specification. Then, these molds are respectively positioned in a cold isostatic pressing forming machine and kept under forming pressure of 250 MPa for 30 seconds, and then the tubular compacts with the numbers of 1 to 10 are prepared after demoulding. Next, these compacts are filled into sintering boats, and these sintering boats are positioned into a sintering furnace for sintering, cooled with the furnace after sintering, and finally, the samples 1 to 10 are taken out from each sintering boat.

TABLE 1

The components and contents of the raw materials adopted in the experimental examples 1 to 10

| Experiment Number | Ti powder (elementary substance) | $TiH_2$ powder | Si powder (elementary substance) | C powder (elementary substance) | TiC powder | $Ti_3SiC_2$ powder | Others |
|---|---|---|---|---|---|---|---|
| 1 | 65.65% | None | 14.35% | 20.00% | None | None | None |
| 2 | None | 72.10% | 16.30% | 11.60% | None | None | None |
| 3 | 75.65% | None | 14.35% | 10.00% | None | None | None |
| 4 | None | 68.50% | 15.49% | 11.01% | None | None | Al powder (the rest) |
| 5 | None | 67.05% | 15.16% | 10.79% | None | None | Cr powder (the rest) |
| 6* | None | 77.25% | 7.25% | 15.50% | None | None | None |
| 7* | None | 24.53% | 16.58% | None | 58.89% | None | None |
| 8* | None | None | None | None | None | 100 | None |
| 9* | None | 32.08% | 7.70% | None | 38.50% | None | $NH_4HCO_3$ (the rest) |
| 10* | None | 32.26% | 5.16% | None | 55.30% | None | $NH_4HCO_3$ (the rest) |

1.1 The Sintering Systems of the Experimental Examples 1 to 7

The sintering systems of the experimental examples 1 to 7 can be divided into five stages. At the first stage, the sintering temperature is gradually increased from room temperature to 450° C., the temperature-raising velocity is controlled at 1-25° C./min, and the total sintering time of the stage is 30-600 minutes. At the second stage, the sintering temperature is gradually increased from 450° C. to 900° C., the temperature-raising velocity is controlled at 1-20° C./min, and the total sintering time of the stage is 180-1000 minutes. At the third stage, the sintering temperature is gradually increased from 900° C. to 1000° C., the temperature-raising velocity is controlled at 1-20° C./min, and the total sintering time of the stage is 30-1000 minutes. At the fourth stage, the sintering temperature is gradually increased from 1000° C. to 1200° C., the temperature-raising velocity is controlled at 1-20° C./min, and the total sintering time of the stage is 30-600 minutes. At the fifth stage, the sintering temperature is gradually increased from 1200° C. to 1450° C., the temperature-raising velocity is controlled at 1-20° C./min, and the total sintering time at the stage is 60-600 minutes, and at this stage, the temperature should be kept within the temperature range of 1300-1400° C. for 2-3 hours. The main purpose of the first stage stated above is to degrease; the main purpose of the second stage is to form pores by the dehydrogenation of $TiH_2$ (excepting the experimental examples 1 and 3) and to promote forming pores by the reaction between Ti and C and generating TiC; the main purpose of the third stage is to further promote forming pores by the reaction between Ti and C and generating TiC; the main purpose of the fourth stage is to generate liquid phase Si, and the main purpose of the fifth stage is to promote the reaction between Ti, liquid phase Si and TiC for generating the $Ti_3SiC_2$ ternary MAX phase compound finally. Keeping temperature within the temperature range of 1300-1400° C. for 2-3 hours at the fifth stage can improve the crystallization degree of the $Ti_3SiC_2$ ternary MAX phase compound, thereby ensuring the tensile strength of the materials.

The sintering process parameters of the five stages in the sintering process of the experimental examples 1 to 7 are shown in Table 2 in details. In Table 2, the unit of the temperature-raising velocity is ° C./min, and the unit of the sintering time is minute.

1.2 The Sintering Systems of the Experimental Examples 8 to 10

The sintering system of the experimental example 8 is relatively simpler, which is, in particular, gradually increasing the sintering temperature from room temperature to 1300° C., and controlling the temperature-raising velocity at 15° C./min with a total sintering time of 180 minutes.

The sintering system of the experimental example 9 is divided into four stages. The first stage is gradually increasing the sintering temperature from room temperature to 150° C., controlling the temperature-raising velocity at 3° C./min, and then keeping temperature for 30 minutes for accomplishing the pore-forming by the decomposition of $NH_4HCO_3$. The second stage is gradually increasing the sintering temperature from 150° C. to 480° C., controlling the temperature-raising velocity at 8° C./min, and then keeping temperature for 120 minutes for finishing the pore-forming by the dehydrogenation of $TiH_2$. The third stage is gradually increasing the sintering temperature from 480° C. to 620° C., controlling the temperature-raising velocity at 2° C./min, and then keeping temperature for 240 minutes for accomplishing the pore-forming by the reaction between Ti and Si and generating the Ti—Si binary intermetallic compound. The fourth stage is gradually increasing the sintering temperature from 620° C. to 1300° C., controlling the temperature-raising velocity at 5° C./min, and then keeping temperature for 300 minutes for promoting the reaction between the Ti—Si binary intermetallic compound and TiC so as to generate the $Ti_3SiC_2$ ternary MAX phase compound finally.

The sintering system of the experimental example 12 is divided into four stages. The first stage is gradually increasing the sintering temperature from room temperature to 350° C., controlling the temperature-raising velocity at 5° C./min, and then keeping temperature for 60 minutes for accomplishing the pore-forming by the decomposition of $NH_4HCO_3$. The second stage is gradually increasing the sintering temperature from 350° C. to 560° C., controlling the temperature-raising velocity at 10° C./min, and then keeping temperature for 60 minutes for completing the pore-forming by the dehydrogenation of $TiH_2$. The third stage is gradually increasing the sintering temperature from 560° C. to 950° C., controlling the temperature-raising velocity at 1° C./min, and then keeping temperature for 360 minutes for accomplishing the pore-forming by the reaction between Ti and Si and generating the Ti—Si binary intermetallic compound. The fourth stage is gradually increasing the sintering temperature from 950° C. to 1400° C., con-

TABLE 2 the sintering systems of the experimental examples 1 to 6

| Experiment Number | The first stage | | The second stage | | The third stage | | The fourth stage | | The fifth stage | |
|---|---|---|---|---|---|---|---|---|---|---|
| | Temperature-raising velocity | Sintering time | Temperature-raising velocity | Sintering time | Temperature-raising velocity | Sintering time | Temperature-raising velocity | Sintering time | Temperature-raising velocity | Sintering time |
| 1 | 5 | 150 | 2 | 470 | 5 | 200 | 5 | 100 | 2 | 300 |
| 2 | 5 | 150 | 2 | 650 | 5 | 200 | 5 | 100 | 2 | 300 |
| 3 | 5 | 150 | 2 | 470 | 5 | 200 | 5 | 100 | 2 | 300 |
| 4 | 5 | 150 | 2 | 650 | 5 | 200 | 5 | 100 | 2 | 300 |
| 5 | 5 | 150 | 2 | 650 | 5 | 200 | 5 | 100 | 2 | 300 |
| 6* | 5 | 150 | 2 | 650 | 5 | 200 | 5 | 100 | 2 | 300 |
| 7* | 5 | 150 | 4 | 360 | 10 | 100 | 5 | 100 | 2 | 300 | trolling the temperature-raising velocity at 3° C./min, and then keeping temperature for 420 minutes for promoting the reaction between the Ti—Si binary intermetallic compound and TiC so as to generate the $Ti_3SiC_2$ ternary MAX phase compound finally.

2 the Phase Compositions and the Property Parameters of the Materials.

In order to characterize the sintered porous materials corresponding to the samples 1 to 10 more clearly, the phase compositions and materials property parameters of the samples 1 to 10 are described as following. Among them, it is intended to study the effects of the addition of other substances except Ti, Si and C on the final properties of the materials by the experimental examples 4 and 5; therefore, only the sample 4 is chosen as the example for illustrating the phase compositions of the material.

The samples 1 to 4 and the samples 6 to 10 are tested by XRD, and the results thereof are shown in Table 3.

TABLE 3 the phase compositions of the samples 1 to 6 and the samples 8 to 10

| Numbers of the samples | Phase compositions |
|---|---|
| 1 | $Ti_3SiC_2$, SiC and a small amout of C |
| 2 | $Ti_3SiC_2$ |
| 3 | $Ti_3SiC_2$, TiC and $TiSi_x$ |
| 4 | $Ti_3SiC_2$ and $Ti_3Si_xAl_{1-x}C_2$ solid solution |
| 6* | $Ti_3SiC_2$ and TiC |
| 7* | $Ti_3SiC_2$ |
| 8* | $Ti_3SiC_2$ |
| 9* | $Ti_3SiC_2$ and TiC |
| 10* | $Ti_3SiC_2$ and TiC |

The properties tests of the samples 1 to 10 are shown in Table 4. Among them, the bubbling method is adopted for the measurement of the porosity and the average pore diameter of the materials; specifically, the filtration flux is the pure water filtration flux under a filtration pressure difference of 0.05 MPa with a thickness of 5 mm at most for the tested porous material; the tests of the tensile strength of the materials are to machine the samples 1 to 10 to standard samples according to the Chinese national standard GB 7963-87 and then measuring the samples by a tensile machine; and the corrosion resistance of the materials is characterized by the weight loss rate after being immersed into a 5 wt. % (i.e. the weight percentage is 5) hydrochloric acid solution at room temperature for 48 days.

TABLE 4 the properties tests results of the samples 1 to 10

| | Test items | | | | | |
|---|---|---|---|---|---|---|
| Numbers of the samples | Thickness (mm) | Porosity (%) | Average pore diameter (μm) | Tensile strength (MPa) | Filtration flux (t/m²·h) | Corrosion resistance (weight loss rate %) |
| 1 | 4.9 | 45 | 5.3 | 25 | 1.6 | 1.35 |
| 2 | 5.1 | 57 | 5.2 | 32 | 2.2 | 0.67 |
| 3 | 5.2 | 43 | 5.5 | 29 | 1.4 | 0.83 |
| 4 | 5.0 | 56 | 5.3 | 35 | 2.6 | 0.65 |
| 5 | 4.8 | 55 | 5.6 | 33 | 2.1 | 0.62 |
| 6* | 4.9 | 52 | 5.2 | 17 | 1.9 | 0.72 |
| 7* | 5.0 | 38 | 5.0 | 25 | 0.7 | 0.74 |
| 8* | 5.1 | 33 | 3.1 | 20 | 0.5 | 0.85 |
| 9* | 5.1 | 67 | 4.8 | 17 | 1.8 | 1.13 |
| 10* | 4.9 | 54 | 5.1 | 19 | 1.6 | 0.97 |

3 The Analysis of the Test Results

1) Referring to Table 4, all of the samples 1 to 5 has tensile strength of at least 23 MPa, a filtration flux of at least 1 t/m²·h under the filtration pressure difference of 0.05 MPa, and a weight loss rate of at most 1.5% after being immersed into the 5 wt. % hydrochloric acid solution at room temperature for 48 days (whereas that of TiAl intermetallic compound porous material is up to about 2.8%). Among them, the tensile strength of the sample 1 is 25 MPa and closes to the lower limit value of 23 MPa; whereas the tensile strength of the materials significantly increases from the sample 2, all of the tensile strength of the rest samples in the samples 2 to 5 except the sample 3 is at least 30 MPa, and the tensile strength of the sample 4 is the highest. All of the filtration flux of the rest samples in the samples 1 to 5 except the samples 1 and 3 is larger than 2 t/m²·h. Also, all of the weight loss rates of the samples 6 to 10 after being immersed into the 5 wt. % hydrochloric acid solution for 48 days are at most 1.5%; however, none of the samples 6 to 10 can reach the tensile strength of at least 23 MPa and the filtration flux of at least 1 t/m²·h under the filtration pressure difference of 0.05 MPa at the same time.

2) As for the tensile strength of the materials, it is shown combined with Table 3 that in the samples 1 to 5, the tensile strength of the materials decreases to a certain degree with the generation of the TiC phase (the sample 3). Compared to the sample 2, the sample 6 has higher content of Ti and C and relatively lower content of Si, thereby generating more TiC phase; thus, the significant adverse effect on the tensile strength of the sample 6 is generated. There is no reaction phase transition during the sintering process of the sample 10, thereby resulting in the lower tensile strength of the material. Both of the samples 9 and 10 use $NH_4HCO_3$ as the pore forming agent, thereby obtaining higher porosity, and combing with the more generation of the TiC phase, hence, similarly, the tensile strength of the material can not reach 23 MPa yet.

3) The permeability of the materials. It can be concluded from the filtration flux of samples 1 to 10 that: the reaction between C and Ti in the raw materials improves the pore structures, such that the tortuosity factor of the three-dimensional through hole decreases, thereby the passing resistance of the filter media decreases and the more preferable filtration flux can be obtained. Both of samples 9 and 10 use the pore forming agent so as to make the porosity of samples 9 and 10 reaches or even exceeds that of samples 2 to 5; however, in the case of that the average pore diameters are substantially same, the filtration flux of samples 9 and 10 can remain reach or even be less than that of the samples 2 to 5, thereby further demonstrating the effect of forming pores by the reaction between C and Ti on the improvement of the tortuosity factor of the three-dimensional through hole.

The invention claimed is:

1. A sintered porous material for filtration comprising
   (a) three elements Ti, Si and C which constitute at least 90% of the weight of the porous material, wherein 60-75% of the weight of the three elements is Ti and 10-20% of the weight of the three elements is Si, wherein C is primarily in the form of $Ti_3SiC_2$ ternary MAX phase compound that is substantially evenly dispersed in the porous material; and
   (b) at least an element selected from the group consisting of Cr, Mo, V, Nb and W;
   the porous material having 30-60% porosity, 0.5-50 μm average pore size, and at least 23 MPa tensile strength, wherein the porous material of 5 mm thickness under 0.05 MPa pressure has a pure water filtration flux of at least 1 t/m²·h, and a weight loss rate of no more than 1.5% after having been immersed in a 5 wt % hydrochloric acid solution at room temperature for 48 days.

2. The sintered porous material of claim 1, wherein the three elements Ti, Si and C constitute at least 95% of the weight of the porous material.

3. The sintered porous material of claim 2 consisting of three elements Ti, Si, and C, wherein the crystalline phase of the porous material consists of $Ti_3SiC_2$ ternary MAX phase compound.

4. The sintered porous material of claim 1, wherein the porous material has an average pore diameter of 1-20 μm.

5. A filter element comprising the sintered porous material of any of claims 1 to 4.

* * * * *